United States Patent
Chen (10) Patent No.: US 9,577,566 B2
(45) Date of Patent: Feb. 21, 2017

(54) MOTOR DRIVING CIRCUIT

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/816,117

(22) Filed: Aug. 3, 2015

(65) Prior Publication Data

US 2016/0344328 A1 Nov. 24, 2016

(30) Foreign Application Priority Data

May 22, 2015 (TW) .................................. 104116452

(51) Int. Cl.
*H02K 29/06* (2006.01)
*H02P 6/00* (2016.01)
*H02P 27/16* (2006.01)

(52) U.S. Cl.
CPC ..................................... *H02P 27/16* (2013.01)

(58) Field of Classification Search
USPC ....................... 318/400.26, 400.32
See application file for complete search history.

(56) References Cited

U.S. PATENT DOCUMENTS

| 4,686,437 A | 8/1987 | Langley et al. |
| 6,020,700 A * | 2/2000 | Tien .......................... H02P 6/14 318/400.26 |
| 8,704,467 B2 * | 4/2014 | Hosoito ................ D06F 37/306 318/370 |
| 2014/0055067 A1 * | 2/2014 | Kuroda ............... H02P 23/0077 318/400.32 |

FOREIGN PATENT DOCUMENTS

| TW | 200711286 A | 3/2007 |
| TW | I319931 B | 1/2010 |

* cited by examiner

*Primary Examiner* — Eduardo Colon Santana
*Assistant Examiner* — Cortez Cook
(74) *Attorney, Agent, or Firm* — Li & Cai Intellectual Property (USA) Office (57) ABSTRACT

A motor driving circuit is provided, which selects a Hall sensor or a Sensor-less controller to achieve the phase commutation of a magnetic pole of a motor through a hall positive terminal and a hall negative terminal of a hall control device. When the hall positive terminal and the hall negative terminal receive a first hall signal and a second hall signal generated by the Hall sensor, the motor driving circuit selects the Hall sensor and then accordingly drives the motor. When the hall positive terminal and the hall negative terminal are floating, or one of them receives a high-voltage, the motor driving circuit selects the sensor-less controller and then accordingly drives the motor. Accordingly, the motor driving circuit can select different sensing devices to achieve the phase commutation of the magnetic pole of the motor according to the motor characteristics.

8 Claims, 8 Drawing Sheets

MOTOR DRIVING CIRCUIT

BACKGROUND

1. Technical Field

The present disclosure relates to a motor driving circuit, in particular, to a motor driving circuit which selects a Hall sensor or a Sensor-less controller to achieve the phase commutation of a magnetic pole of a motor.

2. Description of Related Art

A motor is constituted by a stator and a rotor disposed opposite to each other. The rotor can rotate with respect to the stator to operate the motor by the magnetic force and magnetic field change. The magnetic field change represents the phase commutation of the magnetic poles of the motor.

The Hall sensor is used to carry out the phase commutation in the present motor driving method. More specifically, the Hall sensor senses the positions of the magnetic poles of the motor (or the magnetic field change) so as to determine the position of the rotor. Then, the Hall sensor accordingly generates a phase switching signal to control the switch of the coil current in the stator, thereby achieving the phase commutation. With the miniaturization of the motor technology, the volume of Hall sensor has gradually decreased. However, the accuracy of the miniature Hall sensor easily suffers from temperature, noise, or other factors to influence the reliability of the commutation control. As such, the conditions and environment of where a motor is applied becomes further limited.

Another motor driving method utilizes the sensor-less controller to achieve the phase commutation of the magnetic pole of the motor. The Sensor-less controller adopts a digital signal processor (DSP) with a complex algorithm (e.g., field oriented control (FOC) and direct torque control (DTC)), and peripheral circuit to achieve the optimization control. Using the sensor-less controller can decrease time and labor cost of getting the accurate position of the sensor, and has lower cost. However, when the operation speed of the motor is lower or stops, the sensor-less controller does not adapt to the starting state because the sensor-less controller cannot measure the counter-electromotive force, initial angle, or measures the less counter-electromotive force, etc. When the motor does not have the design of an additional starting mechanism to assist the motor operating to medium-high rotational speed, the sensor-less controller cannot achieve the phase commutation of the magnetic pole of the motor.

If the motor driving circuit could select the hall sensor or the sensor-less controller to achieve the phase commutation of the magnetic pole of the motor, the motor driving circuit could select a suitable sensing device according to the motor characteristics.

SUMMARY

An exemplary embodiment of the instant disclosure provides a motor driving circuit. The motor driving circuit is adapted for driving a motor. The motor driving circuit includes a full bridge circuit, a control circuit, a sensor-less controller, a hall control device, and a select circuit. The full bridge circuit is electrically connected to the motor, and is configured for receiving an input voltage. The control circuit is electrically connected to the full bridge circuit. The control circuit is configured for controlling the phase commutation of the full bridge circuit according to a phase switching signal, to transform the input voltage into a plurality of driving voltage signals in the full bridge circuit and to accordingly control the operation of the motor. The sensor-less controller is configured for receiving the driving voltage signal, to sense the phase of the driving voltage signals and to accordingly output a first switching signal. The hall control device has a hall positive terminal and a hall negative terminal. The hall positive terminal is configured for receiving a first hall signal. The hall negative terminal is configured for receiving a second hall signal. The hall control device is configured for outputting a second switching signal according to the first hall signal and the second hall signal. The select circuit is electrically connected to the sensor-less controller and the hall control device. The select circuit is configured for selecting the first switching signal as the phase switching signal or selecting the second switching signal as the phase switching signal according to the first hall signal and the second hall signal.

To sum up, the motor driving circuit provided by the exemplary embodiments selects the hall sensor or the sensor-less controller to achieve the phase commutation of the magnetic pole of the motor through the output pins of the hall control device, to accordingly operate the motor. Therefore, the motor driving circuit can select different sensing devices to achieve the phase commutation of the magnetic pole of the motor according to the motor characteristics.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides a motor driving circuit, which selects a hall sensor or a sensor-less controller to achieve the phase commutation of a magnetic pole of a motor through two output pins of a hall control device, i.e., a hall positive terminal and a hall negative terminal. Furthermore, when the hall positive terminal and the hall negative terminal receive a first hall signal and a second hall signal generated by the Hall sensor, the motor driving circuit selects the Hall sensor to execute the phase commutation and then accordingly drives the motor. When the hall positive terminal and the hall negative terminal are floating, or one of them receives a high-voltage, the motor driving circuit selects the sensor-less controller to execute the phase commutation and then accordingly drives the motor. Accordingly, the motor driving circuit can select a different sensing device to achieve the phase commutation of the magnetic pole of the motor according to the motor characteristics. The motor driving circuit provided in the exemplary embodiment of the present disclosure will be described in the following paragraphs.

Figure 1:
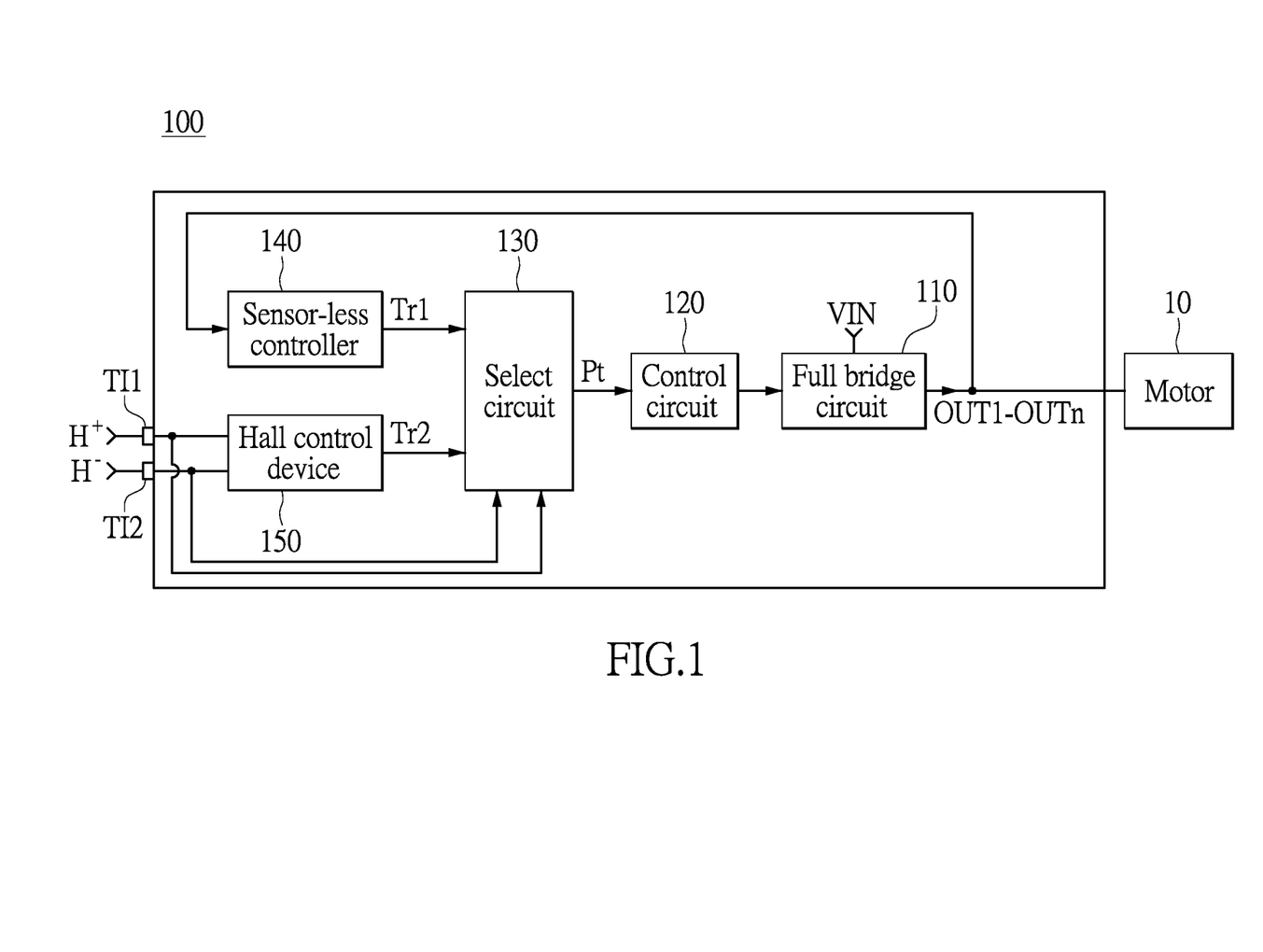
FIG. 1 shows the diagram of a motor driving circuit according to an embodiment of the instant disclosure.

Firstly, please refer to FIG. 1, which shows the diagram of a motor driving circuit according to an embodiment of the instant disclosure. As shown in FIG. 1, the motor driving circuit 100 drives a motor 10 according to a stator and a rotor (not shown in FIGS.) opposite to the motor 10. More specifically, the rotor can rotate with respect to the stator to operate the motor 10 by the magnetic force and magnetic field change.

The motor driving circuit 100 includes a full bridge circuit 110, a control circuit 120, a select circuit 130, a sensor-less controller 140, and a hall control device 150. The full bridge circuit 110 electrically connects to the motor 10, and receives an input voltage VIN. The control circuit 120 electrically connects to the full bridge circuit 110 and controls the phase commutation of the full bridge circuit 110 according to a phase switching signal Pt. Then the full bridge circuit 110 transforms the input voltage VIN into a plurality of driving voltage signals OUT1-OUTn, to control the operation of the motor 10.

Figure 2:
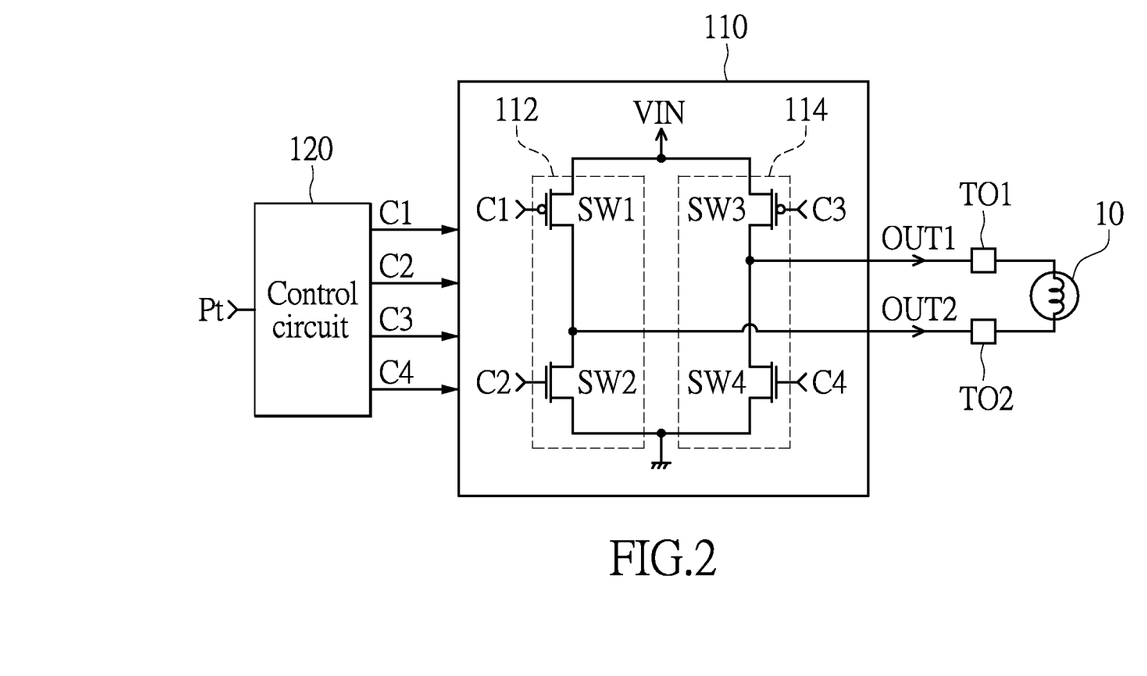
FIG. 2 shows the diagram of a control circuit, a single-phase full bridge circuit, and a single-phase motor according to another embodiment of the instant disclosure.

For example, as shown in FIG. 2, the motor 10 is a single-phase motor. The full bridge circuit 110 connected to the motor 10 is a single-phase full bridge circuit having two bridge-arms configured in parallel. The two bridge-arms are the first bridge-arm 112 and the second bridge-arm 114 respectively. The number of the aforementioned driving voltage signals is two. The two driving voltage signals are the first driving voltage signal OUT1 and the second driving voltage signal OUT2 respectively. The first bridge-arm 112 has a first switch SW1 and a second switch SW2. An end of the first switch SW1 receives the input voltage VIN. Another end of the first switch SW1 electrically connects to an end of the second switch SW2. Another end of the second switch SW2 connects to ground. The second bridge-arm 114 has a third switch SW3 and a fourth switch SW4. An end of the third switch SW3 receives the input voltage VIN. Another end of the third switch SW3 electrically connects to an end of the fourth switch SW4. Another end of the fourth switch SW4 connects to ground. In the instant disclosure, the first switch SW1 and the third switch SW3 are PMOS transistors, and the second switch SW2 and the fourth switch SW4 are NMOS transistors. The first switch SW1, the second switch SW2, the third switch SW3, and the fourth switch SW4 can be other kinds of switches, and the instant disclosure is not limited thereto.

The control circuit 120 controls the phase commutation of the full bridge circuit 110 according the phase switching signal Pt, i.e., the control circuit 120 generates four control signals C1, C2, C3, and C4 to respectively control the turn-on and turn-off of the first switch SW1, second switch SW2, third switch SW3, and fourth switch SW4 according to the phase switching signal Pt. Then the full bridge circuit 110 respectively generates two phase currents to the motor 10 through two driving terminals TO1 and TO2 configured in the motor driving circuit. The first driving voltage signal OUT1 and the second driving voltage signal OUT2 are respectively outputted from the driving terminals TO1 and TO2. This means that the first driving voltage signal OUT1 is outputted between the first switch SW1 and the second switch SW2, and the second driving voltage signal OUT2 is outputted between the third switch SW3 and the fourth switch SW4, to control the operation of the motor 10. Persons of ordinary skill in this technology field should realize the implementation of the phase commutation between the motor 10 and the full bridge circuit 110, and the operation of the motor 10, so detailed description is omitted.

Figure 3:
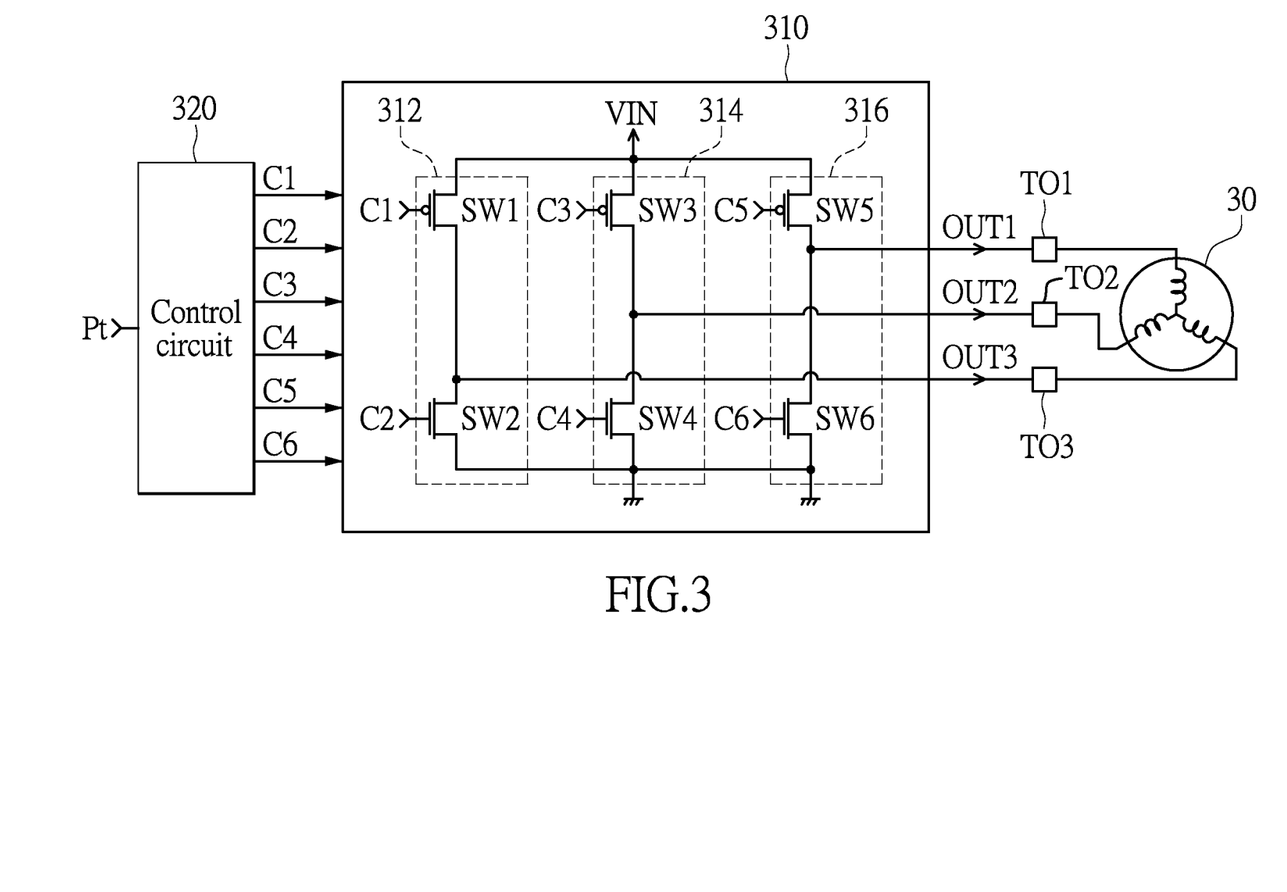
FIG. 3 shows the diagram of a control circuit, a three-phase full bridge circuit, and a three-phase motor according to another embodiment of the instant disclosure.

For another example, as shown in FIG. 3, the motor 30 is a three-phase motor. The full bridge circuit 310 connected to the motor 30 is a three-phase full bridge circuit having three bridge-arms configured in parallel. The three bridge-arms are the first bridge-arm 312, the second bridge-arm 314, and the third bridge-arm 316 respectively. The number of the aforementioned driving voltage signals is three. The three driving voltage signals are the first driving voltage signal OUT1, the second driving voltage signal OUT2, and the third driving voltage signal OUT3 respectively. The first bridge-arm 312 has a first switch SW1 and a second switch SW2. An end of the first switch SW1 receives the input voltage VIN. Another end of the first switch SW1 electrically connects to an end of the second switch SW2. Another end of the second switch SW2 connects to ground. The second bridge-arm 314 has a third switch SW3 and a fourth switch SW4. An end of the third switch SW3 receives the input voltage VIN. Another end of the third switch SW3 electrically connects to an end of the fourth switch SW4. Another end of the fourth switch SW4 connects to ground. The third bridge-arm 316 has a fifth switch SW5 and a sixth switch SW6. An end of the fifth switch SW5 receives the input voltage VIN. Another end of the fifth switch SW5 electrically connects to an end of the sixth switch SW6. Another end of the sixth switch SW6 connects to ground. In the instant disclosure, the first switch SW1, the third switch SW3, and the fifth switch SW5 are PMOS transistors, and the second switch SW2, the fourth switch SW4, and the sixth switch SW6 are NMOS transistors. The first switch SW1, the second switch SW2, the third switch SW3, the fourth switch SW4, the fifth switch SW5, and the sixth switch SW6 can be other kinds of switches, and the instant disclosure is not limited thereto.

The control circuit 320 controls the phase commutation of the full bridge circuit 310 according to the phase switching signal Pt, i.e., the control circuit 320 generates six control signals C1, C2, C3, C4, C5, and C6 to respectively control the turn-on and turn-off of the first switch SW1, second switch SW2, third switch SW3, fourth switch SW4, fifth switch SW5, and sixth switch SW6 according to the phase switching signal Pt. Then the full bridge circuit 310 respectively generates three phase currents to the motor 30 through three driving terminals TO1, TO2, and TO3 configured in the motor driving circuit. The first driving voltage signal OUT1, the second driving voltage signal OUT2, and the third driving voltage signal OUT3 are respectively outputted from the driving terminals TO1, TO2, and TO3. This means that the first driving voltage signal OUT1 is outputted between the first switch SW1 and the second switch SW2, the second driving voltage signal OUT2 is outputted between the third switch SW3 and the fourth switch SW4, and the third driving voltage signal OUT3 is outputted between the fifth switch SW5 and the sixth switch SW6, to control the operation of the motor 30. Persons of ordinary skill in this technology field should realize the implementation of the phase commutation between the motor 30 and the full bridge circuit 310, and the operation of the motor 30, so detailed description is omitted.

Please return to FIG. 1. The sensor-less controller 140 receives the driving voltage signals OUT1-OUTn and senses the phase of the driving voltage signals OUT1-OUTn, to accordingly generate a first switching signal Tr1. More specifically, the sensor-less controller 140 senses the counter-electromotive force generated from the stator during the rotation of the rotor and then accordingly determines the position of the rotor, to output the first switching signal Tr1. Persons of ordinary skill in this technology field should realize the inner structures of the sensor-less controller 140 and the implementation of determining the position of the rotor, so detailed description is omitted.

The hall control device 150 has a hall positive terminal TI1 and a hall negative terminal TI2. The hall positive terminal TI1 receives a first hall signal H+. The hall negative terminal TI2 receives a second hall signal H−. The hall control device 150 generates a second switching signal Tr2 according to the first hall signal H+ and the second hall signal H−. More specifically, the hall control device 150 senses the positions of the magnetic poles of the motor (or the magnetic field change) so as to determine the position of the rotor. Then the hall control device 150 accordingly generates a second switching signal Tr2. Persons of ordinary skill in this technology field should realize the inner structures of the hall control device 150 and the implementation of determining the position of the rotor, so detailed description is omitted.

It is worth to note that the select circuit 130 electrically connects the sensor-less controller 140 and the hall control device 150, to select the first switching signal Tr1 or the second switching signal Tr2 as the phase switching signal Pt according to the first hall signal H+ and the second hall signal H−.

Figure 4:
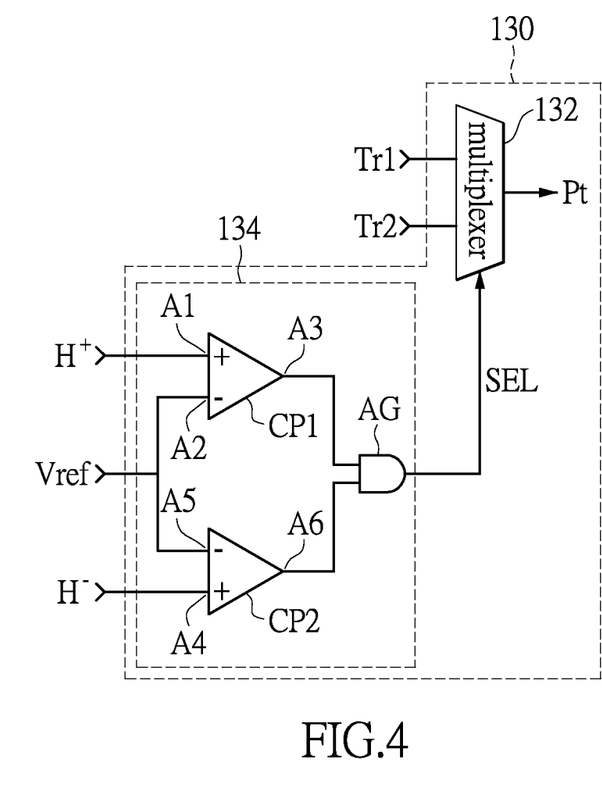
FIG. 4 shows the diagram of a select circuit according to an embodiment of the instant disclosure.

Please refer to FIG. 4 in conjunction with FIG. 1. More specifically, the select circuit 130 includes a determining element 134 and a multiplexer 132. The determining element 134 electrically connects to the hall positive terminal TI1 and the hall negative terminal TI2, to respectively receive the first hall signal H+ and the second hall signal H−. The multiplexer 132 electrically connects among the sensor-less controller 140, the hall control device 150, and the control circuit 120. The determining element 134 determines whether the first hall signal H+ or the second hall signal H− is more than or equal to a reference voltage Vref, to accordingly generate a select signal SEL to the multiplexer 132. When the determining element 134 determines that the first hall signal H+ or the second hall signal H− is more than or equal to the reference voltage Vref, the determining element 134 generates the select signal SEL indicating transmitting the first switching signal Tr1 as the phase switching signal Pt to the control circuit 120. When the determining element 134 determines that the first hall signal H+ or the second hall signal H− is less than the reference voltage Vref, the determining element 134 generates the select signal SEL indicating transmitting the second switching signal Tr2 as the phase switching signal Pt to the control circuit 120. The determining element 134 can also use other determining method, so that the multiplexer 132 selects the first switching signal Tr1 or second switching signal Tr2 as the phase switching signal Pt according to the first hall signal H+ and the second hall signal H−. The instant disclosure is not limited thereto.

In the instant embodiment, the determining element 134 includes a first comparator CP1, a second comparator CP2, and an and gate AG. The first comparator CP1 has a first positive input end A1, a first negative input end A2, and a first output end A3. The first positive input end A1 electrically connects to the hall positive terminal TH. The first negative input end A2 receives the reference voltage Vref. The first comparator CP1 generates a first potential to the first output end A3 according to the first hall signal H+ and the reference voltage Vref. This means that when the first hall signal H+ is more than or equal to the reference voltage Vref, the first comparator CP1 generates the first potential indicating the high potential to the first output end A3. Conversely, when the first hall signal H+ is less than the reference voltage Vref, the first comparator CP1 generates the first potential indicating the low potential to the first output end A3.

The second comparator CP2 has a second positive input end A4, a second negative input end A5, and a second output end A6. The second positive input end A4 electrically connects to the hall negative terminal TI2. The second negative input end A5 receives the reference voltage Vref. The second comparator CP2 generates a second potential to the second output end A6 according to the second hall signal H− and the reference voltage Vref. It means that when the second hall signal H− is more than or equal to the reference voltage Vref, the second comparator CP2 generates the second potential indicating the high potential to the second output end A6. Conversely, when the second hall signal H− is less than the reference voltage Vref, the second comparator CP2 generates the second potential indicating the low potential to the second output end A6.

The and gate AG electrically connects among the first comparator CP1, the second comparator CP2, and the multiplexer 132, and generates the select signal SEL according to the first potential and the second potential. Therefore, when the first comparator CP1 generates a first potential with high potential "1" or the second comparator CP2 generates a second potential with high potential "1", the and gate AG generates the select signal SEL with high potential "1". At this time, the multiplexer 132 transmits the first switching signal Tr1 to the control circuit 120 according to the select signal SEL with high potential "1", so that the first switching signal Tr1 is taken as the phase switching signal Pt. When the first comparator CP1 generates a first potential with high potential "0" and the second comparator CP2 generates a second potential with high potential "0", the and gate AG generates the select signal SEL with high potential "0". At this time, the multiplexer 132 transmits the second switching signal Tr2 to the control circuit 120 according to the select signal SEL with high potential "0", so that the second switching signal Tr2 is taken as the phase switching signal Pt.

Next, the control circuit 120 controls the phase commutation of the full bridge circuit 110 according to a phase switching signal Pt. Then the full bridge circuit 110 transforms the input voltage VIN into a plurality of driving voltage signals OUT1-OUTn, to control the operation of the motor 10. With respect to internal components and operations of the control circuit 120 controlling the phase commutation of the full bridge circuit 110, and the full circuit 110 controlling the operation of the motor 10, this is illustrated in the aforementioned disclosure, so detailed description is omitted.

Figure 5:
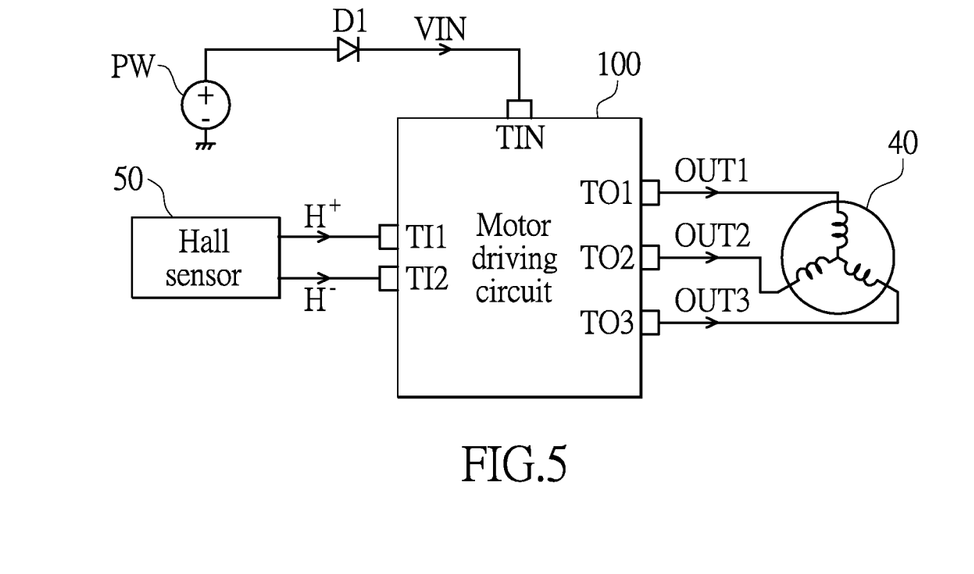
FIG. 5 shows the diagram of a hall positive terminal and a hall negative terminal connected to an external hall sensor according to an embodiment of the instant disclosure.
Figure 6:
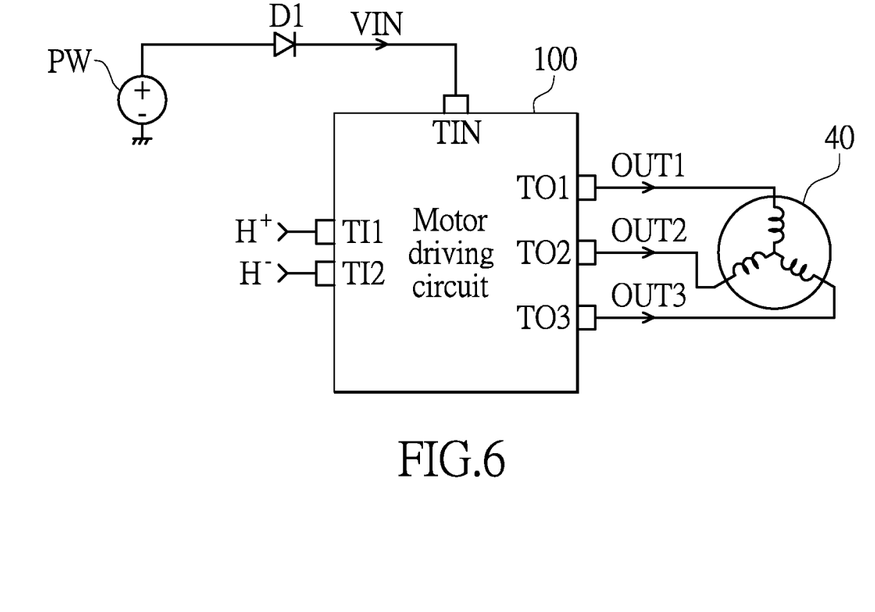
FIG. 6 shows the diagram of a hall positive terminal and a hall negative terminal to be floating according to an embodiment of the instant disclosure.
Figure 7A:
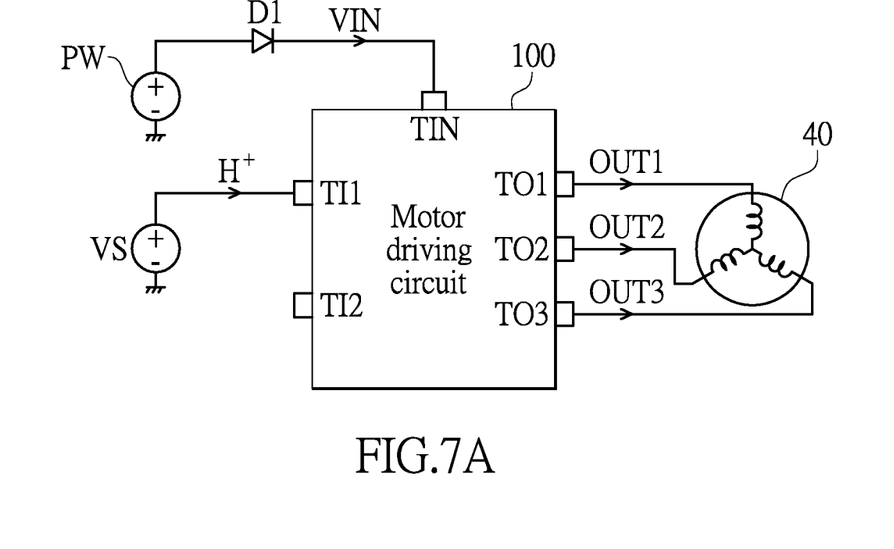
FIG. 7A shows the diagram of a hall positive terminal connected to an external voltage source and a hall negative terminal to be floating according to an embodiment of the instant disclosure.
Figure 7B:
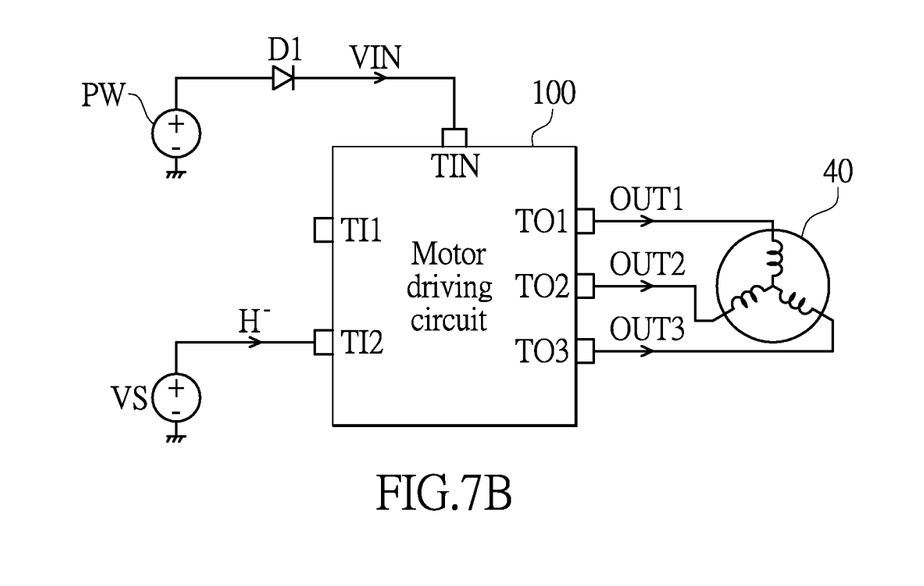
FIG. 7B shows the diagram of a hall positive terminal to be floating and a hall negative terminal connected to an external voltage source according to an embodiment of the instant disclosure.

The hall positive terminal TI1 and the hall negative terminal TI2 electrically connected to a hall sensor 50 (as shown in FIG. 5), the hall positive terminal TI1 and the hall negative terminal TI2 floating (as shown in FIG. 6), the hall positive terminal TI1 electrically connected to a constant voltage source VS (as shown in FIG. 7A), and the hall negative terminal TI2 electrically connected to the constant voltage source VS (as shown in FIG. 7B) will be described in the following paragraph, to describe using the hall positive terminal TI1 and the hall negative terminal TI2 of different potential to select the hall control device 150 or the sensor-less controller 140 for achieving the phase commutation of the magnetic pole of the motor 10. For the convenience in the description, the motor driving circuit 100 configures a power supply terminal TIN. A power supply PW generates an input voltage VIN, and then transmits the input voltage VIN to the power supply terminal TIN through a protective diode D1 for supplying the power of the motor driving circuit 100. In the instant disclosure, the motor 40 is a three-phase motor. The motor 40 electrically connects to three driving terminals TO1, TO2, and TO3 of the motor driving circuit 100.

Firstly, please refer to FIG. 5 in conjunction with FIG. 1. The hall sensor 50 electrically connects to the hall positive terminal TI1 and the hall negative terminal TI2. The hall sensor 50 is used for sensing the magnetic field change during the rotation of the motor 40, to respectively generate the first hall signal H+ and the second hall signal H− less than the reference voltage Vref to the hall positive terminal TI1 and the hall negative terminal TI2. At present, the first hall signal H+ and the second hall signal H− are opposite. Next, the select circuit 130 selects the hall control device 150 to generate the second switching signal Tr2 as the phase switching signal Pt to the control circuit 120. Accordingly, the motor driving circuit 100 selects the hall sensor 50 to control the phase commutation of the full bridge circuit 110. Then the motor driving circuit 100 respectively outputs the first driving voltage signal OUT1, the second driving voltage signal OUT2, and the third driving voltage signal OUT3 from the three driving terminals TO1, TO2, and TO3, to accordingly control the operation of the motor 40.

Next, please refer to FIG. 6 in conjunction with FIGS. 1 and 4. The hall positive terminal TI1 and the hall negative terminal TI2 of the hall control device 150 are floating. At present, the hall positive terminal TI1 and the hall negative terminal TI2 respectively outputs the first hall signal H+ and the second hall signal H− more than or equal to the reference voltage Vref. Next, the select circuit 130 selects the first switching signal Tr1 generated by the sensor-less controller 140 as the phase switching signal Pt to the control circuit 120. Accordingly, the motor driving circuit 100 selects the sensor-less controller 140 to control the phase commutation of the full bridge circuit 110, and then accordingly controls the operation of the motor 40.

Next, please refer to FIG. 7A in conjunction with FIGS. 1 and 4. When the hall positive terminal TI1 of the hall control device 150 electrically connects to a constant voltage source VS, the hall positive terminal TI1 outputs the first hall signal H+ more than or equal to the reference voltage Vref. At this time, no matter whether the hall negative terminal TI2 is floating, electrically connects to the constant voltage source VS, or connects to ground, the select circuit 130 selects the first switching signal Tr1 generated by the sensor-less controller 140 as the phase switching signal Pt to control the circuit 120. Accordingly, the motor driving circuit 100 selects the sensor-less controller 140 to control the phase commutation of the full bridge circuit 110, and then accordingly controls the operation of the motor 40.

Similarly, please refer to FIG. 7B in conjunction with FIGS. 1 and 4. When the constant voltage source VS is changed to connect to the hall negative terminal TI2 of the hall control device 150, the hall negative terminal TI2 outputs the second hall signal H− more than or equal to the reference voltage Vref. At present, no matter whether the hall positive terminal TI1 is floating, electrically connects to the constant voltage source VS, or connects to ground, the select circuit 130 selects the first switching signal Tr1 generated by the sensor-less controller 140 as the phase switching signal Pt to control circuit 120. Accordingly, the motor driving circuit 100 selects the sensor-less controller 140 to control the phase commutation of the full bridge circuit 110, and then accordingly controls the operation of the motor 40.

In summary, the invention is to provide a motor driving circuit, which selects a hall sensor or a sensor-less controller to achieve the phase commutation of the magnetic pole of the motor through the received potentials from the hall positive terminal and the hall negative terminal. More specifically, when the hall positive terminal and the hall negative terminal receive the first hall signal and the second hall signal generated by the hall sensor, the motor driving circuit selects the hall sensor to execute the phase commutation and then accordingly drives the motor. When the hall positive terminal and the hall negative terminal are floating, or one of the hall positive terminal and the hall negative terminal receives the high voltage, the motor driving circuit selects the sensor-less controller to execute the phase commutation and then accordingly drives the motor. Accordingly, the motor driving circuit can select different sensing devices to achieve the phase commutation of the magnetic pole of the motor according to the motor characteristics.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:
1. A motor driving circuit, adapted for driving a motor, and the motor driving circuit comprising:
   a full bridge circuit, electrically connected to the motor, and configured for receiving an input voltage;
   a control circuit, electrically connected to the full bridge circuit, and configured for controlling the phase commutation of the full bridge circuit according to a phase switching signal, to transform the input voltage into a plurality of driving voltage signals in the full bridge circuit and to accordingly control the operation of the motor;
   a sensor-less controller, configured for receiving the driving voltage signal, to sense the phase of the driving voltage signals, and to accordingly output a first switching signal;
   a hall control device, having a hall positive terminal and a hall negative terminal, the hall positive terminal configured for receiving a first hall signal, the hall negative terminal configured for receiving a second hall signal, and the hall control device configured for out- putting a second switching signal according to the first hall signal and the second hall signal; and a select circuit, electrically connected to the sensor-less controller and the hall control device, and configured for selecting the first switching signal as the phase switching signal or selecting the second switching signal as the phase switching signal according to the first hall signal and the second hall signal, the select circuit comprises:
- a determining element, electrically connected to the hall positive terminal and the hall negative terminal, and configured for determining whether the first hall signal or the second hall signal is more than or equal to a reference voltage, to accordingly generate a select signal; and
- a multiplexer, electrically connected among the sensor-less controller, the hall control device, and the control circuit, and configured for transmitting the first switching signal or the second switching signal as the phase switching signal to the control circuit according to the select signal;
- wherein, when the determining element determines that the first hall signal or the second hall signal is more than or equal to the reference voltage, the determining element generates the select signal indicating transmitting the first switching signal as the phase switching signal to the control circuit;
- wherein, when the determining element determines that the first hall signal or the second hall signal is less than the reference voltage, the determining element generates the select signal indicating transmitting the second switching signal as the phase switching signal to the control circuit;

wherein the hall positive terminal is electrically connected to a voltage source, to generate the first hall signal more than or equal to the reference voltage, or the hall negative terminal is electrically connected to the voltage source, to generate the second hall signal more than or equal to the reference voltage.

2. The motor driving circuit according to claim 1, wherein the hall positive terminal and the hall negative terminal of the hall control device are electrically connected to a hall sensor, and the hall sensor is configured for sensing the magnetic field variation of the motor, to output the first hall signal or the second hall signal less than the reference voltage, wherein the first hall signal and the second hall signal are opposite.

3. The motor driving circuit according to claim 1, wherein the hall positive terminal and the hall negative terminal of the hall control device are floating, to output the first hall signal and the second hall signal more than or equal to the reference voltage.

4. The motor driving circuit according to claim 1, wherein the determining element comprises:
- a first comparator, having a first positive input end, a first negative input end, and a first output end, the first positive input end electrically connected to the hall positive terminal, the first negative input end configured for receiving the reference voltage, and the first comparator configured for generating a first potential to the first output end according to the first hall signal and the reference voltage;
- a second comparator, having a second positive input end, a second negative input end, and a second output end, the second positive input end electrically connected to the hall negative terminal, the second negative input end configured for receiving the reference voltage, and the second comparator configured for generating a second potential to the second output end according to the second hall signal and the reference voltage; and
- an and gate, electrically connected among the first comparator, the second comparator, and the multiplexer, and configured for generating the select signal according to the first potential and the second potential.

5. The motor driving circuit according to claim 1, wherein the driving voltage signals are composed of a first driving voltage signal and a second driving voltage signal, the full bridge circuit comprises:
- a first bridge-arm, having a first switch and a second switch, an end of the first switch configured for receiving the input voltage, another end of the first switch electrically connected to an end of the second switch, and another end of the second switch connected to ground; and
- a second bridge-arm, having a third switch and a fourth switch, an end of the third switch configured for receiving the input voltage, another end of the third switch electrically connected to an end of the fourth switch, and another end of the fourth switch connected to ground;
- wherein the first driving voltage signal is outputted between the first switch and the second switch, and the second driving voltage signal is outputted between the third switch and the fourth switch.

6. The motor driving circuit according to claim 1, wherein the driving voltage signals are composed of a first driving voltage signal, a second driving voltage signal, and a third driving voltage signal, the full bridge circuit comprises:
- a first bridge-arm, having a first switch and a second switch, an end of the first switch configured for receiving the input voltage, another end of the first switch electrically connected to an end of the second switch, and another end of the second switch connected to ground;
- a second bridge-arm, having a third switch and a fourth switch, an end of the third switch configured for receiving the input voltage, another end of the third switch electrically connected to an end of the fourth switch, and another end of the fourth switch connected to ground; and
- a third bridge-arm, having a fifth switch and a sixth switch, an end of the fifth switch configured for receiving the input voltage, another end of the fifth switch electrically connected to an end of the sixth switch, and another end of the sixth switch connected to ground;
- wherein the first driving voltage signal is outputted between the first switch and the second switch, the second driving voltage signal is outputted between the third switch and the fourth switch, and the third driving voltage signal is outputted between the fifth switch and the sixth switch.

7. The motor driving circuit according to claim 5, wherein the first switch and the third switch are PMOS transistors, and the second switch and the fourth switch are NMOS transistors.

8. The motor driving circuit according to claim 6, wherein the first switch, the third switch, and the fifth switch are PMOS transistors, and the second switch, the fourth switch, the sixth switch are NMOS transistors.

* * * * *